United States Patent
Shoji et al.

(10) Patent No.: US 9,981,550 B2
(45) Date of Patent: May 29, 2018

(54) VEHICLE BODY MOUNTING STRUCTURE FOR A FUEL TANK

(71) Applicant: Yachiyo Industry Co., Ltd., Sayama-shi, Saitama (JP)

(72) Inventors: Kazuaki Shoji, Sakura (JP); Yuta Matsuzaki, Sakura (JP)

(73) Assignee: Yachiyo Industry Co., Ltd., Sayama-shi Saitama (JP)

( * ) Notice: Subject to any disclaimer, the term of this patent is extended or adjusted under 35 U.S.C. 154(b) by 0 days. days.

(21) Appl. No.: 15/526,021

(22) PCT Filed: Sep. 16, 2015

(86) PCT No.: PCT/JP2015/004739
§ 371 (c)(1),
(2) Date: May 11, 2017

(87) PCT Pub. No.: WO2016/079915
PCT Pub. Date: May 26, 2016

(65) Prior Publication Data
US 2017/0326974 A1 Nov. 16, 2017

(30) Foreign Application Priority Data
Nov. 18, 2014 (JP) .................................. 2014-233545

(51) Int. Cl.
*B60K 15/067* (2006.01)
*B60K 15/03* (2006.01)

(52) U.S. Cl.
CPC .. *B60K 15/067* (2013.01); *B60K 2015/03493* (2013.01)

(58) Field of Classification Search
CPC .... B60K 15/067; B60K 15/07; B60K 15/073; B60K 2015/03493; B60K 2015/0634
See application file for complete search history.

(56) References Cited

U.S. PATENT DOCUMENTS 3,697,093 A * 10/1972 Cadiou ................ B60K 15/067
 280/834
4,886,180 A * 12/1989 Bonczyk ................ B60K 15/00
 220/646
(Continued)

FOREIGN PATENT DOCUMENTS

JP H 05294150 11/1993
JP 06-045828 6/1994
(Continued)

OTHER PUBLICATIONS

International Search Report for PCT/JP2015/004739, dated Nov. 17, 2015, 4 pages.

*Primary Examiner* — Anne Marie M Boehler
*Assistant Examiner* — Michael R Stabley
(74) *Attorney, Agent, or Firm* — Dority & Manning, P.A.

(57) ABSTRACT

To provide a vehicle body mounting structure for a fuel tank tank, which can suppress deformation of the fuel tank due to a band member while suppressing increase in weight of the fuel tank, the vehicle body mounting structure for a fuel tank includes: a band member (21) disposed along a lower surface (14) of the fuel tank (1) made of resin and having both ends secured to the vehicle body; an upper groove (31) formed in a side surface (12) of the fuel tank (1) to extend downward from an upper surface (13) of the fuel tank (1) over at least a part of the side surface (12) of the fuel tank (1); and a cushion member (26) interposed between the fuel tank (1) and the vehicle body and straddling the upper groove (31).

7 Claims, 10 Drawing Sheets (56) References Cited

U.S. PATENT DOCUMENTS

| | | | | |
|---|---|---|---|---|
| 4,930,811 A * | 6/1990 | Tsukada | ........... | B60K 15/03177 180/69.4 |
| 5,167,156 A * | 12/1992 | Tozawa | ................... | G01F 23/32 340/625 |
| 5,186,324 A * | 2/1993 | Brandon, Jr. | ........... | B60P 1/162 137/592 |
| 5,267,714 A * | 12/1993 | Nelson, II | ............ | B60K 15/067 24/DIG. 53 |
| 5,285,923 A * | 2/1994 | Brandon, Jr. | ........... | B60P 1/162 220/562 |
| 6,056,168 A * | 5/2000 | Owen, Jr. | ............. | B60P 3/2205 137/355.16 |
| 6,280,614 B1 * | 8/2001 | Berg | ...................... | B01D 17/00 210/170.08 |
| 6,382,172 B1 * | 5/2002 | Kobayashi | ............. | B60K 15/03 123/198 D |
| 6,578,727 B2 * | 6/2003 | Schmidt | ............... | B60K 15/067 220/562 |
| 7,211,307 B2 * | 5/2007 | Potter | .................... | B29C 65/02 220/4.14 |
| 7,637,386 B2 * | 12/2009 | Roth | ........................ | E03B 3/03 220/501 |
| 7,931,301 B2 * | 4/2011 | Matsumoto | .......... | B60K 15/063 180/68.1 |
| 8,276,697 B2 * | 10/2012 | Takasaki | .................. | B60K 1/04 180/68.5 |
| 8,382,162 B2 * | 2/2013 | Hourai | ................. | B60K 15/067 220/562 |
| 8,636,162 B2 * | 1/2014 | Schoen | .................. | B60K 15/03 220/4.14 |
| 9,242,550 B2 * | 1/2016 | Thompson | ....... | B60K 15/03177 |
| 2001/0045433 A1 * | 11/2001 | Ellis | ........................ | B32B 27/08 220/562 |
| 2010/0109311 A1 * | 5/2010 | Yoshida | ............... | B60K 15/067 280/834 |
| 2014/0027450 A1 * | 1/2014 | Iwase | ................... | B29D 22/003 220/62.11 |
| 2014/0103628 A1 * | 4/2014 | De Biasi | ............. | B60K 15/067 280/834 |
| 2014/0326732 A1 * | 11/2014 | Hutzen | .................. | B29C 49/04 220/562 |
| 2015/0291020 A1 * | 10/2015 | Ley | ........................ | B29C 49/04 220/562 |
| 2016/0257195 A1 * | 9/2016 | Tanabe | .................. | B60K 15/07 |

FOREIGN PATENT DOCUMENTS

| | | |
|---|---|---|
| JP | 2007198449 | 8/2007 |
| JP | 2010202155 | 9/2010 |
| JP | 201484054 | 5/2014 |
| JP | 2014172571 | 9/2014 |

* cited by examiner

VEHICLE BODY MOUNTING STRUCTURE FOR A FUEL TANK

TECHNICAL FIELD

Related Application

The present application is the national stage entry of International Patent Application No. PCT/JP2015/004739 having a filing date of Sep. 16, 2015, which claims priority to Japanese Patent Application No. 2014-233545 filed on Nov. 18, 2014, which are incorporated herein in their entirety by reference thereto.

The present invention relates to a vehicle body mounting structure for a fuel tank for mounting a fuel tank on a vehicle body via a cushion member by use of a band member.

BACKGROUND ART

As a support structure for a fuel tank disposed on an upper surface of a lower vehicle body structural member, a structure is known in which the fuel tank is disposed on the upper surface of the lower vehicle body structural member via a cushion rubber, and a band member is passed around the fuel tank with both ends of the band member being secured to the lower vehicle body structural member to thereby support the fuel tank (Patent Document 1). In this support structure, by increasing the tensile load on the band member (namely, tightening force applied to the fuel tank), it is possible to increase the mounting strength of the fuel tank on the vehicle body.

Also, as a structure for attaching the cushion rubber on the fuel tank as a member for damping vibrations, etc., a structure is known in which the cushion rubber is attached to an outer surface of the fuel tank via a double-sided tape (Patent Document 2).

PRIOR ART DOCUMENT(S)

Patent Document(s)

[Patent Document 1] JPH05-294150A
[Patent Document 2] JP2007-198449A

BRIEF SUMMARY OF THE INVENTION

Task to be Accomplished by the Invention

In recent years, the material of the fuel tank is tending to shift from steel plate to resin. The fuel tanks made of resin have advantages that they do not rust, are light in weight, and can be mass-produced at low cost even with a complex shape. On the other hand, in view of strength, the fuel tanks made of resin are inferior to those made of steel plate. Therefore, in a case where a resin fuel tank is mounted on the vehicle body using the structure disclosed in Patent Document 1, it is necessary that the fuel tank be given such a rigidity that the fuel tank is not deformed under the tightening force applied by the band member. Particularly, in a case where the fuel tank is mounted on the lower surface of the vehicle body using a structure similar to that disclosed in Patent Document 1, it is necessary to increase the tightening force by the band member to prevent inadvertent falling of the fuel tank, and this may result in a deformation of the fuel tank such that the side wall thereof undergoes buckling and is crushed.

The present invention is made in view of such background, and a main object thereof is to provide a vehicle body mounting structure for a fuel tank, which can suppress deformation of the fuel tank by the band member while suppressing increase in weight of the fuel tank.

Means to Accomplish the Task

To achieve the above object, the present invention provides a mounting structure for mounting a fuel tank on a vehicle body, comprising: a fuel tank (1) made of resin and disposed below the vehicle body; a band member (21) disposed along a lower surface (14) of the fuel tank and having both ends secured to the vehicle body; an upper groove (31) formed in a side surface (12) of the fuel tank to extend downward from an upper surface (13) of the fuel tank over at least a part of the side surface of the fuel tank; and a cushion member (26) interposed between the fuel tank and the vehicle body and straddling the upper groove.

According to this configuration, the bottom wall and vertical walls defining the upper groove can increase the rigidity of the side wall of the fuel tank without increasing the thickness of the side wall. Therefore, it is possible to suppress buckling of the side wall while suppressing increase in weight of the fuel tank. Further, because the cushion member is provided to straddle the upper groove, the stress generated in the upper wall of the fuel tank can be dispersed to parts on either side of the upper groove, and the deformation of the upper wall also can be suppressed. In addition, only a single cushion member is required to make the tightening force be received by the parts on either side of the upper groove, and therefore, the work of disposing the cushion member is easy and the work of mounting the fuel tank on the vehicle body is facilitated.

In the above structure, configuration may be made such that the upper groove includes an upper extension groove part (31a) that extends along an upper surface of the fuel tank; and a contact area (26A) between the cushion member and the upper surface of the fuel tank is divided by the upper extension groove part.

According to this configuration, without configuring the upper groove to have a large depth, it is possible to widen the region of the upper wall of the fuel tank provided with a high rigidity by the upper groove, and to dispose the entire length of the cushion member in the high-rigidity region. This makes it possible to use a larger cushion member to disperse the stress on the upper wall of the fuel tank, while preventing deformation of the upper wall due to disposing of the cushion member in a region with a low rigidity.

Further, in the above structure, configuration may be made such that the fuel tank includes an upper connecting wall (5) that is curved to connect the side surface and the upper surface of the fuel tank with each other; and a curvature of a bottom surface (31b) of the upper groove in the upper connecting wall is smaller than a curvature of an outer surface (15) of the upper connecting wall.

According to this configuration, the rigidity of a part of the upper wall remote from the side surface of the fuel tank can be effectively increased, and the deformation of the fuel tank 1 can be suppressed even more effectively.

Further, in the above structure, configuration may be made such that the upper groove has a terminal end (31c) in the upper surface of the fuel tank; and a contact area (26A) between the cushion member and the upper surface of the fuel tank surrounds the upper groove from three sides.

According to this configuration, even when the upper groove cannot be extended in the upper surface of the fuel tank, the cushion member is disposed over the entire part of the upper wall of the fuel tank provided with a high rigidity by the upper groove, whereby the stress on the upper wall is dispersed effectively.

Further, in the above structure, configuration may be made such that the mounting structure further comprises a lower groove (36) formed in the side surface of the fuel tank to extend upward from the lower surface of the fuel tank over at least a part of the side surface of the fuel tank, wherein the band member is disposed to straddle the lower groove.

According to this configuration, the rigidity of a part of the lower wall of the fuel tank where the largest tightening force resulting from the tensile load on the band member is applied can be increased by the bottom wall and vertical walls defining the lower groove, whereby buckling of the side wall can be suppressed. Further, because the band member is disposed to straddle the lower groove, the stress generated in the lower wall of the fuel tank can be dispersed and the deformation of the lower wall can be suppressed. Furthermore, compared to a case where the band member is disposed along the bottom surface of the lower groove, the stress generated in the side wall of the fuel tank can be dispersed.

Further, in the above structure, configuration may be made such that the band member includes an elastic sheet (23) provided on a surface thereof facing the fuel tank; and the elastic sheet is disposed to straddle the lower groove.

According to this configuration, the elastic sheet suppresses shifting between the band member and the fuel tank. Further, because the elastic sheet is disposed to straddle the lower groove, the elastic sheet protrudes into the lower groove beyond the parts on either side of the lower groove, and this suppresses shifting between the elastic sheet and the fuel tank effectively.

Further, in the above structure, configuration may be made such that the lower groove includes a lower extension groove part (36a) that extends along the lower surface of the fuel tank; and the elastic sheet is disposed to straddle the lower extension groove part over an entire length of the lower extension groove part.

According to this configuration, it is possible to increase the rigidity in a region of the lower wall of he fuel tank remote from the side surface. Further, the shifting between the band member and the fuel tank and the shifting between the elastic sheet and the fuel tank are suppressed even more effectively.

Further, in the above structure, configuration may be made such that the fuel tank includes a lower connecting wall (6) that is curved to connect the side surface and the lower surface of the fuel tank with each other; and a curvature of a bottom surface (36b) of the lower groove in the lower connecting wall is smaller than a curvature of an outer surface (16) of the lower connecting wall.

According to this configuration, the rigidity of a part of the lower wall remote from the side surface of the fuel tank can be effectively increased, and the deformation of the fuel tank 1 can be suppressed even more effectively.

Further, in the above structure, configuration may be made such that the upper groove and the lower groove are connected with each other.

According to this configuration, it is possible to increase the rigidity of the side wall of the fuel tank over its entirety in the vertical direction.

Further, in the above structure, configuration may be made such that the fuel tank has a pinch-off part (7) formed on the side surface of the fuel tank to extend in a lateral direction; and the upper groove and the lower groove are separated by the pinch-off part.

According to this configuration, the upper groove and the lower groove can be formed without complicating the shape of the pinch-off part. Further, because the pinch-off part has a larger thickness and a higher rigidity than the other part, even though the upper groove and the lower groove are separated from each other, it is possible to increase the rigidity of the side wall of the fuel tank over the entirety thereof in the vertical direction.

Effect of the Invention

Thus, according to the present invention, it is possible to provide a vehicle body mounting structure for a fuel tank tank, which can suppress deformation of the fuel tank by the band member while suppressing increase in weight of the fuel tank.

EMBODIMENTS FOR CARRYING OUT THE INVENTION

In the following, embodiments of the present invention will be described in detail with reference to the drawings.

First Embodiment

Figure 1:
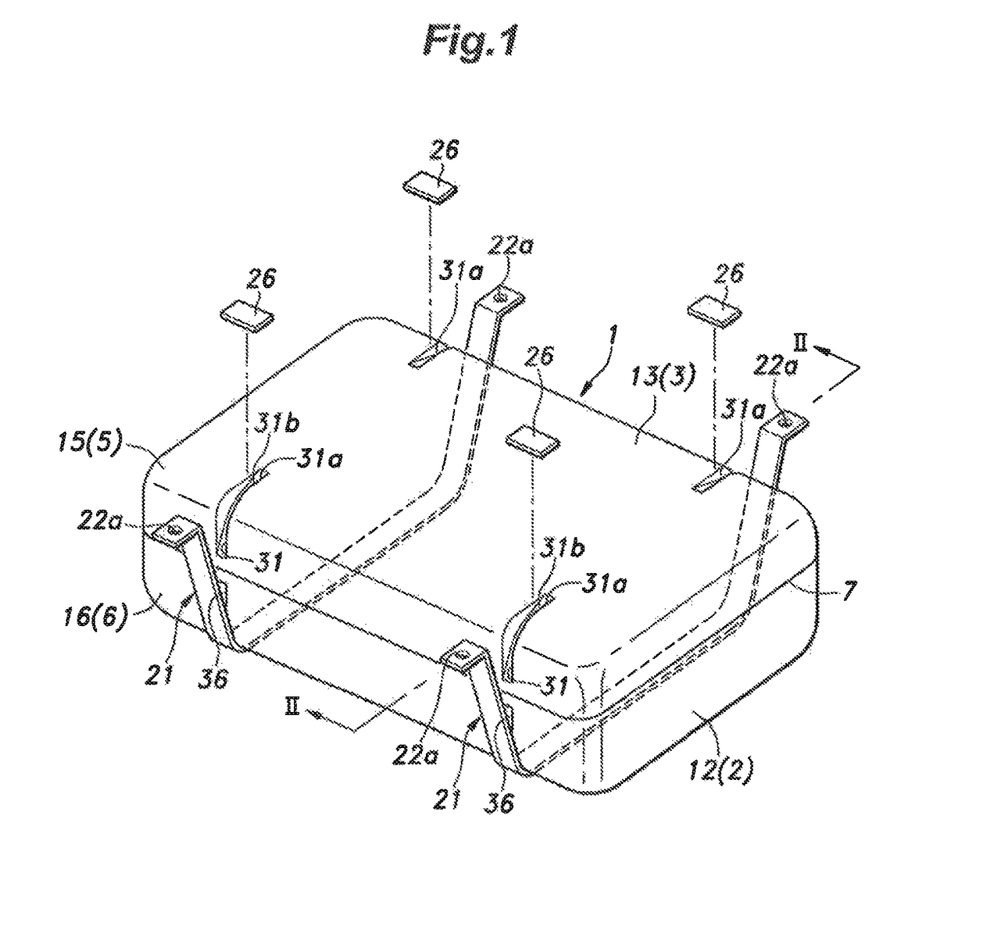
FIG. 1 is a perspective view showing a fuel tank according to the first embodiment in a state before being mounted on the vehicle body.
Figure 2:
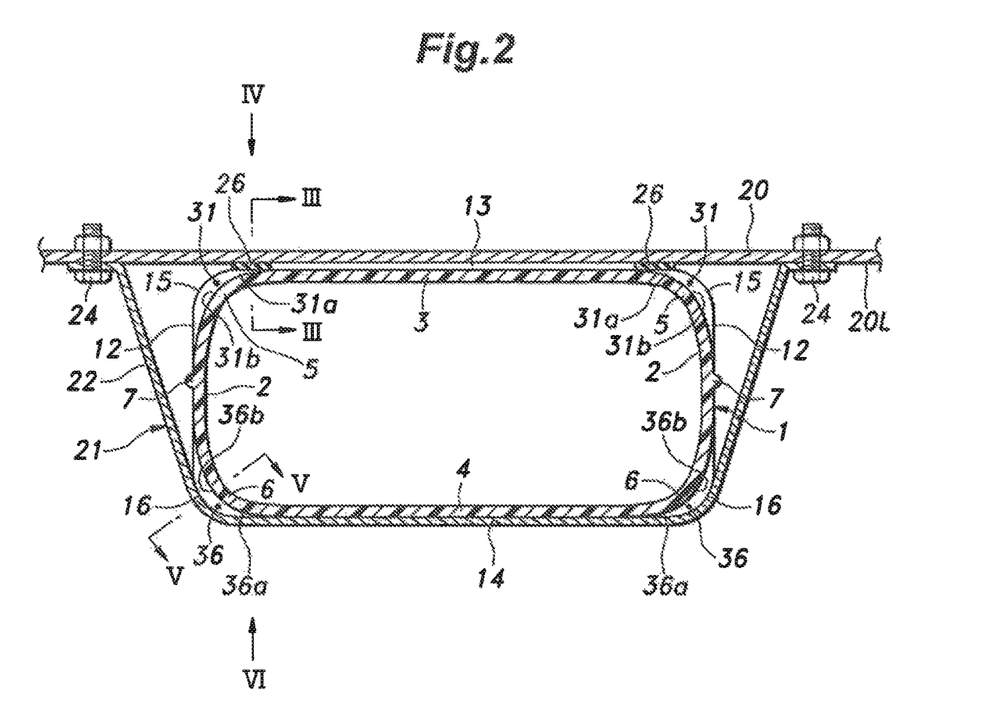
FIG. 2 is a cross-sectional view showing the fuel tank of FIG. 1 as mounted on the vehicle body.

First, with reference to FIGS. 1 to 6, the first embodiment of the present invention will be described. As shown in FIGS. 1 and 2, a fuel tank 1 is a substantially rectangular parallelepiped container for storing fuel, and has an annular side wall 2, a upper wall 3, and a lower wall 4, where the side wall 2 includes a front wall, a rear wall, a right wall, and a left wall. Two walls adjoining each other and extending in intersecting directions are connected with each other. In the illustrated embodiment, the connecting part between each adjoining two walls is constituted by a curved connecting wall. Namely, the fuel tank 1 is in the shape of a rectangular parallelepiped having rounded corners. In the following description, the connecting wall that connects the upper wall 3 and the side wall 2 will be referred to as an upper connecting wall 5, and the connecting wall that connects the lower wall 4 and the side wall 2 will be referred to as a lower connecting wall 6.

It is to be noted that it cannot be determined unambiguously whether the upper connecting wall 5 belongs to the upper wall 3 or the side wall 2, and whether the lower connecting wall 6 belongs to the lower wall 4 or the side wall 2. For example, it is possible to consider that the entirety of the upper connecting wall 5 belongs to either the side wall 2 or the upper wall 3, or to consider that a part of the upper connecting wall 5 belongs to the upper wall 3 and the remaining part of the same belongs to the side wall 2. This is the same with the lower connecting wall 6. When it is considered that the entirety of the upper connecting wall 5 belongs to the side wall 2, the boundary between the upper wall 3 and the side wall 2 corresponds to the upper end of the upper connecting wall 5. When it is considered that the entirety of the upper connecting wall 5 belongs to the upper wall 3, the boundary between the upper wall 3 and the side wall 2 corresponds to the lower end of the upper connecting wall 5. Namely, the boundary between the upper wall 3 and the side wall 2 and the boundary between the lower wall 4 and the side wall 2 can be any position in the upper connecting wall 5 and the lower connecting wall 6, respectively, and thus, are not definite.

In this description, because the objet of the invention is to suppress buckling of the side wall 2, the boundary between the upper wall 3 and the side wall 2 is defined to be at or above the position or region where the tilt angle of the upper connecting wall is 45 degrees. Also, the boundary between the lower wall 4 and the side wall 2 is defined to be at or below the position or region where the tilt angle of the lower connecting wall is 45 degrees. Therefore, for example, when a groove is formed in the side wall 2 such that the groove extends downward from, at the lowest, the position on the upper connecting wall 5 where the tilt angle is 45 degrees, this groove qualifies as a later-described upper groove 31 of the present invention. Similarly, when a groove is formed in the side wall 2 such that the groove extends upward from, at the highest, the position on the lower connecting wall 6 where the tilt angle is 45 degrees, this groove qualifies as a later-described lower groove 36 of the present invention.

In the following description, for convenience, description will be made assuming that the entirety of the upper connecting wall 5 and the entirety of the lower connecting wall 6 belong to the side wall 2; in other words, the upper end of the upper connecting wall 5 is the boundary between the upper wall 3 and the side wall 2, and the lower end of the lower connecting wall 6 is the boundary between the lower wall 4 and the side wall 2.

An outer surface of the side wall 2 including the upper connecting wall 5 and the lower connecting wall 6 constitutes a side surface 12 of the fuel tank 1, an outer surface of the upper wall 3 constitutes an upper surface 13 of the fuel tank 1, and an outer surface of the lower wall 4 constitutes a lower surface 14 of the fuel tank 1. Further, an outer surface of the upper connecting wall 5 constitutes an upper connecting surface 15 (in this embodiment, part of only the side surface 12), and an outer surface of the lower connecting wall 6 constitutes a lower connecting surface 16 (in this embodiment, part of only the side surface 12).

The fuel tank 1 is a resin product having a multilayer structure manufactured by sandwiching two resin sheets formed by melt extrusion between upper and lower dies and performing vacuum forming, for example, and at a vertically intermediate position on the side wall 2, an annular pinch-off part 7 is formed due to sandwiching between the upper die and the lower die. The fuel tank 1 actually has a complex structure and has various components and devices mounted thereon, but in the drawings, they are omitted and the fuel tank 1 is shown schematically.

The fuel tank 1 is mounted on a lower surface 20L of a vehicle body 20 by a pair of band members 21 which are disposed to extend in a fore-and-aft direction along the lower surface 14 and each have ends secured to the vehicle body 20 (refer to FIG. 2). Each band member 21 has a band main body 22 made of steel, which is formed by press-forming a cold rolled steel plate into a shape that is convex downward in correspondence with the lower surface 14 of the fuel tank 1, for example, and an elastic sheet 23 attached on a surface of the band main body 22 facing the fuel tank 1 (refer to FIG. 5). Namely, the band member 21 includes the elastic sheet 23 provided on the surface facing the fuel tank 1.

The elastic sheet 23 functions to increase a frictional force of the band main body 22 against the fuel tank 1 and to prevent damage to the fuel tank 1 caused by contact with the band main body 22. In this embodiment, the elastic sheet 23 is attached over the entire length of a part of the band main body 22 that would contact the fuel tank 1 (from the upper end of one lower connecting surface 16 to the upper end of the other lower connecting surface 16).

Each of the two ends of the band main body 22 is provided with a bolt through-hole 22a. Each band member 21 is disposed to extend along the lower surface 14 of the fuel tank 1, and in this state, the two ends thereof are secured to the vehicle body 20 by use of bolts 24, whereby the fuel tank 1 is mounted on the vehicle body 20 by the band members 21 with a prescribed tightening force.

Between the upper surface 13 of the fuel tank 1 and the lower surface 20L of the vehicle body 20 are interposed a plurality of cushion members 26. Each cushion member 26 is formed of elastomer material such as elastic rubber or resin and has a shape of a rectangular parallelepiped or sheet. The cushion members 26 are disposed at two positions for each band member 21; namely, at four positions in total. The cushion members 26 are disposed on parts of the upper surface 13 of the fuel tank 1 located above the band members 21 and in a periphery of the upper surface 13. In this embodiment, each cushion member 26 is affixed to the upper surface 13 of the fuel tank 1 with a double-sided tape prior to mounting of the fuel tank 1 on the vehicle body 20.

At positions on the side surface 12 of the fuel tank 1 corresponding to the band members 21 are formed four upper grooves 31 each extending downward from the upper surface 13 of the fuel tank 1 to a part slightly higher than the pinch-off part 7. The positions corresponding to the band members 21 are regions extending, from respective positions where the tightening force of the corresponding band member 21 is applied, in the direction of the tightening force along the outer surface of the fuel tank 1. In the illustrated embodiment where the band members 21 extend to the height of the upper surface 13 of the fuel tank 1, the positions corresponding to the band members 21 are positions opposing the band members 21.

Each upper groove 31 has an upper extension groove part 31a extending along the upper surface 13 of the fuel tank 1. The upper groove 31 becomes progressively deeper as it extends upward along the side surface 12 of the fuel tank 1. Also, the upper extension groove part 31a becomes progressively deeper as it extends toward the side surface 12 along the upper surface 13 of the fuel tank 1. Namely, in the upper connecting wall 5, the bottom surface 31b of the upper groove 31 is more linear than the upper connecting surface 15. In other words, the curvature of the bottom surface 31b of the upper groove 31 in the upper connecting wall 5 is smaller than the curvature of the upper connecting surface 15.

Figure 3:
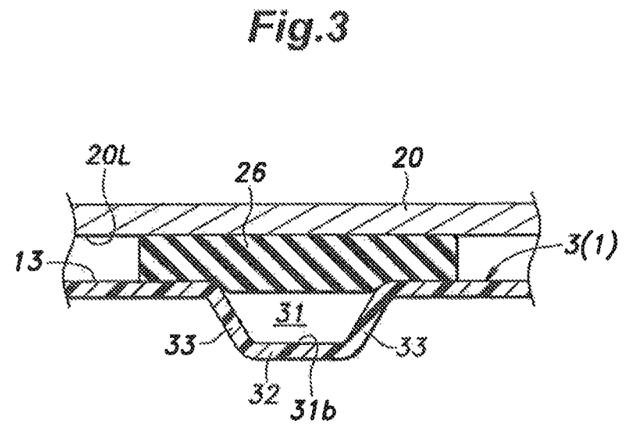
FIG. 3 is a cross-sectional view taken along line III-III in FIG. 2.

As shown in FIG. 3, each upper groove 31 is formed by bending the upper wall 3 and the side wall 2 of the fuel tank 1 with a substantially uniform thickness. The upper groove 31 is defined by a bottom wall 32 forming the bottom surface 31b that extends linearly as viewed in the cross section and a pair of vertical walls 33 which extend from either end of the bottom wall 32 so as to diverge from each other toward an exterior the fuel tank 1 until reaching the parts of the upper wall 3 or the side wall 2 on either side of the upper groove 31. Each cushion member 26 is provided on the upper surface 13 of the fuel tank 1 so as to straddle the upper groove 31. Namely, the cushion member 26 has a width larger than the opening width of the upper groove 31, and is disposed to contact the upper surface 13 of the fuel tank 1 on either side of the upper groove 31.

Figure 4:
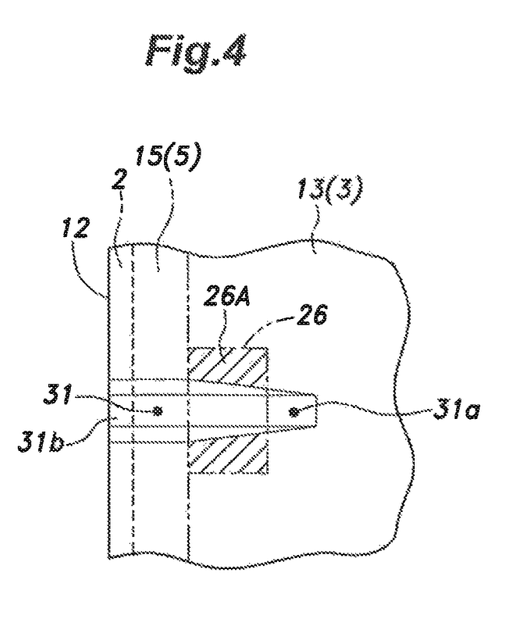
FIG. 4 is a top view showing an essential part of the fuel tank of FIG. 1 (showing the part as viewed in a direction indicated by arrow IV in FIG. 2)

As shown in FIG. 4, a contact area 26A between each cushion member 26 and the upper surface 13 of the fuel tank 1 is divided by the upper extension groove part 31a. Namely, the upper extension groove part 31a of the upper groove 31 is formed to be longer than the length of the cushion member 26, and the entirety of the cushion member 26 is disposed in a part of the upper surface 13 of the fuel tank 1 where the rigidity is increased by the upper groove 31.

With reference to FIGS. 1 and 2 again, at the positions on the side surface 12 of the fuel tank 1 corresponding to the band members 21 are formed four lower grooves 36 each extending upward from the lower surface 14 of the fuel tank 1 to a part slightly lower than the pinch-off part 7. The positions corresponding to the band members 21 have been explained above with regard to the upper grooves 31. The lower grooves 36 and the upper grooves 31 are formed on a same plane that passes the center of each band member 21, and are separated by the pinch-off part 7.

Each lower groove 36 has a lower extension groove part 36a extending along the lower surface 14 of the fuel tank 1. The lower groove 36 becomes progressively deeper as it extends downward along the side surface 12 of the fuel tank 1. Also, the lower extension groove part 36a becomes progressively deeper as it extends toward the side surface 12 along the lower surface 14 of the fuel tank 1. Namely, in the lower connecting wall 6, the bottom surface 36b of the lower groove 36 is more linear than the lower connecting surface 16. In other words, the curvature of the bottom surface 36b of the lower groove 36 in the lower connecting wall 6 is smaller than the curvature of the lower connecting surface 16.

Figure 5:
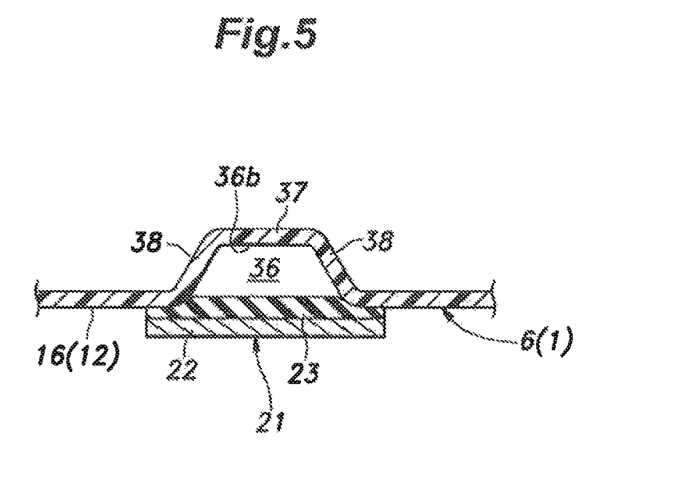
FIG. 5 is a cross-sectional view taken along line V-V in FIG. 2.

As shown in FIG. 5, each lower groove 36 is formed by bending the side wall 2 and the lower wall 4 of the fuel tank 1 with a substantially uniform thickness. The lower groove 36 is defined by a bottom wall 37 forming the bottom surface 36b that extends linearly as viewed in the cross section and a pair of vertical walls 38 which extend from either end of the bottom wall 37 so as to diverge from each other toward an exterior of the fuel tank 1 until reaching the parts of the side wall 2 or the lower wall 4 on either side of the lower groove 36. The elastic sheet 23 is configured to have a width approximately the same as that of the band main body 22, and is disposed to straddle the lower groove 36. Namely, the elastic sheet 23 has a width larger than the opening width of the lower groove 36, and is disposed to contact the lower connecting surface 16 and the lower surface 14 of the fuel tank 1 on either side of the lower groove 36.

Figure 6:
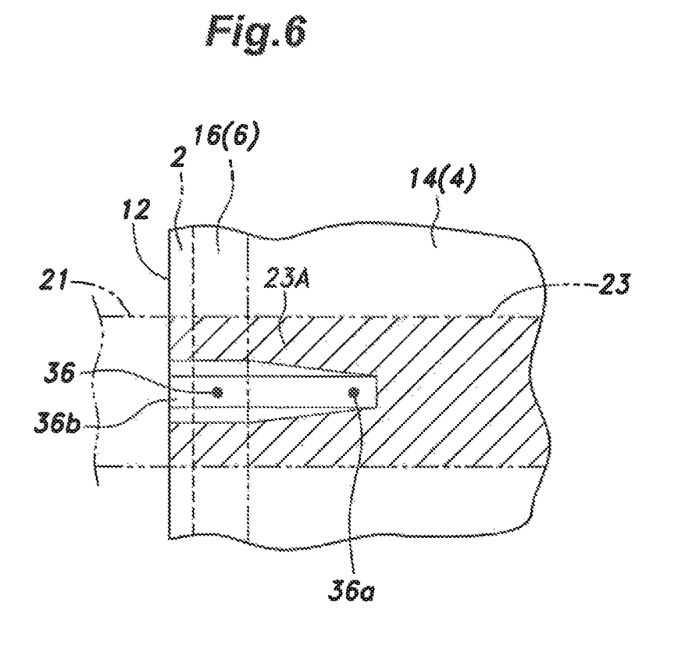
FIG. 6 is a bottom view showing an essential part of the fuel tank of FIG. 1 (showing the part as viewed in a direction indicated by arrow VI in FIG. 2)

As shown in FIG. 6, the elastic sheet 23 is provided to straddle the lower extension groove part 36a over the entire length of the lower extension groove part 36a. Therefore, at the part where the lower extension groove part 36a is formed, a contact area 23A between the elastic sheet 23 and the lower surface 14 of the fuel tank 1 is divided laterally by the lower extension groove part 36a.

In the above-constructed mounting structure of the fuel tank on the vehicle body 20, the following effects can be obtained.

As shown in FIGS. 1 and 2, the side surface 12 of the fuel tank 1 is provided with the upper grooves 31 extending downward from the upper surface 13 of the fuel tank 1 over at least a part of the side surface 12 of the fuel tank 1, and therefore, even when the side wall 2 does not have a large wall thickness, the rigidity of the side wall 2 of the fuel tank 1 is increased by the bottom wall 32 and the vertical walls 33 defining each upper groove 31. Thereby, buckling of the side wall 2 is suppressed while increase in the weight of the fuel tank 1 is suppressed. Further, because the side surface 12 of the fuel tank 1 is provided with the lower grooves 36 extending upward from the lower surface 14 of the fuel tank 1 over at least a part of the side surface 12 of the fuel tank 1, the rigidity of a part of the lower wall 4 of the fuel tank 1 where the largest tightening force resulting from the tensile load on the band members 21 is applied is increased, and buckling of the side wall 2 is suppressed.

Further, as shown in FIG. 3, because each cushion member 26 is provided on the upper surface 13 of the fuel tank 1 to straddle the upper groove 31, the stress generated in the upper wall 3 of the fuel tank 1 is dispersed and the deformation of the upper wall 3 is suppressed. In addition, only a single cushion member 26 is required to make the tightening force be received by parts on either side of each upper groove 31, and therefore, the work of affixing the cushion members 26 is easy and the work of mounting the fuel tank 1 on the vehicle body 20 is facilitated.

In the present embodiment, as shown in FIGS. 1 and 2, each upper groove 31 includes the upper extension groove part 31a that extends along the upper surface 13 of the fuel tank 1, and as shown in FIG. 4, the contact area 26A between each cushion member 26 and the upper surface 13 of the fuel tank 1 is divided by the upper extension groove part 31a. Thereby, even when the upper groove 31 is not configured to have a large depth, the region of the upper wall 3 of the fuel tank 1 provided with a high rigidity by the upper groove 31 is widened, and the entire length of the cushion member 26 can be disposed in this high-rigidity region. This makes it possible to use the cushion member 26 with a large size to disperse the stress on the upper wall 3, while suppressing deformation of the upper wall 3 due to disposing of the cushion member 26 in a region with a low rigidity.

In the present embodiment, as shown in FIG. 2, the fuel tank 1 includes the upper connecting wall 5 that is curved to connect the side surface 12 and the upper surface 13 with each other, and the curvature of the bottom surface 31b of the upper groove 31 in the upper connecting wall 5 is smaller than the curvature of the upper connecting surface 15. Also, the fuel tank 1 includes the lower connecting wall 6 that is curved to connect the side surface 12 and the lower surface 14 with each other, and the curvature of the the bottom surface 36b of the lower groove 36 in the lower connecting wall 6 is smaller than the curvature of the lower connecting surface 16. Thereby, the rigidity of a part of the upper wall 3 and the lower wall 4 remote from the side surface 12 of the fuel tank 1 is effectively increased, and the deformation of the fuel tank 1 is suppressed even more effectively.

In the present embodiment, as shown in FIG. 5, each band member 21 is disposed to straddle the lower groove 36, and thus, the stress generated in the lower wall 4 of the fuel tank 1 is dispersed and the deformation of the lower wall 4 is suppressed. Further, compared to a case where the band member 21 is disposed along the bottom surfaces 36b of the lower grooves 36, the stress generated in the side wall 2 of the fuel tank 1 is dispersed and the deformation of the upper wall 3 is suppressed.

In the present embodiment, each band member 21 is provided with the elastic sheet 23 on a surface thereof facing the fuel tank 1, and the elastic sheet 23 suppresses shifting between the band member 21 and the fuel tank 1. Further, the elastic sheet 23 is provided to straddle the lower groove 36. As a result, owing to elastic deformation of the elastic sheet 23 in the contact area 23A, a part of the elastic sheet 23 corresponding to the lower groove 36 protrudes into the lower groove 36 beyond the parts of the side surface 12 or the lower surface 14 of the fuel tank 1 on either side of the lower groove 36. This suppresses shifting between the elastic sheet 23 and the fuel tank 1 effectively.

In the present embodiment, each lower groove 36 includes the lower extension groove part 36a that extends along the lower surface 14 of the fuel tank 1, and each elastic sheet 23 is provided to straddle the lower extension groove part 36a over an entire length thereof. Thereby, the rigidity in the region of the lower wall 4 of the fuel tank 1 remote from the side surface 12 is increased. Further, the shifting between the band members 21 and the fuel tank 1 and the shifting between the elastic sheet 23 and the fuel tank 1 are suppressed even more effectively.

In the present embodiment, the upper grooves 31 and the lower grooves 36 are vertically separated from each other by the pinch-off part 7. Therefore, the upper grooves 31 and the lower grooves 36 can be formed without requiring the pinch-off part 7 to have a complex shape. Further, the pinch-off part 7 is formed on the side surface 12 of the fuel tank 1 to extend in a lateral direction. Because the pinch-off part 7 has a larger thickness and a higher rigidity than the other part, even though the upper grooves 31 and the lower grooves 36 are separated from each other, it is possible to increase the rigidity of the side wall 2 of the fuel tank 1 over the entirety thereof in the vertical direction.

Second Embodiment

Next, with reference to FIG. 7, the second embodiment of the present invention will be described. The members or parts similar to those of the first embodiment will be denoted by same reference signs, and a redundant description will be omitted. This also applies to the description of the third embodiment.

Figure 7:
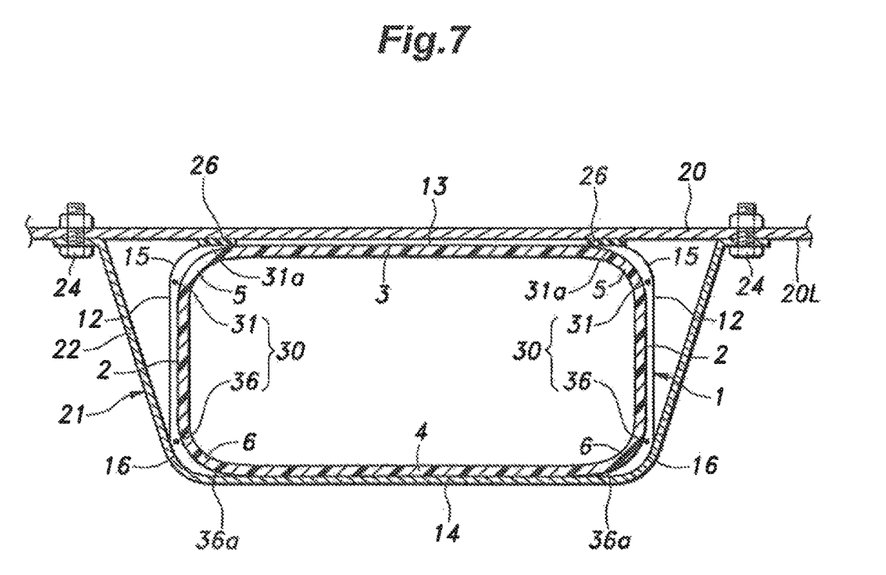
FIG. 7 is a cross-sectional view showing a fuel tank according to the second embodiment as mounted on the vehicle body.

As shown in FIG. 7, in this embodiment, the upper groove 31 extending downward from the upper surface 13 of the fuel tank 1 and the lower groove 36 extending upward from the lower surface 14 of the fuel tank 1 are connected with each other to form a single groove 30. Thereby, the rigidity of the side wall 2 of the fuel tank 1 is increased over its entirety in the vertical direction.

Third Embodiment

Lastly, with reference to FIGS. 8 and 9, the third embodiment of the present invention will be described.

Figure 8:
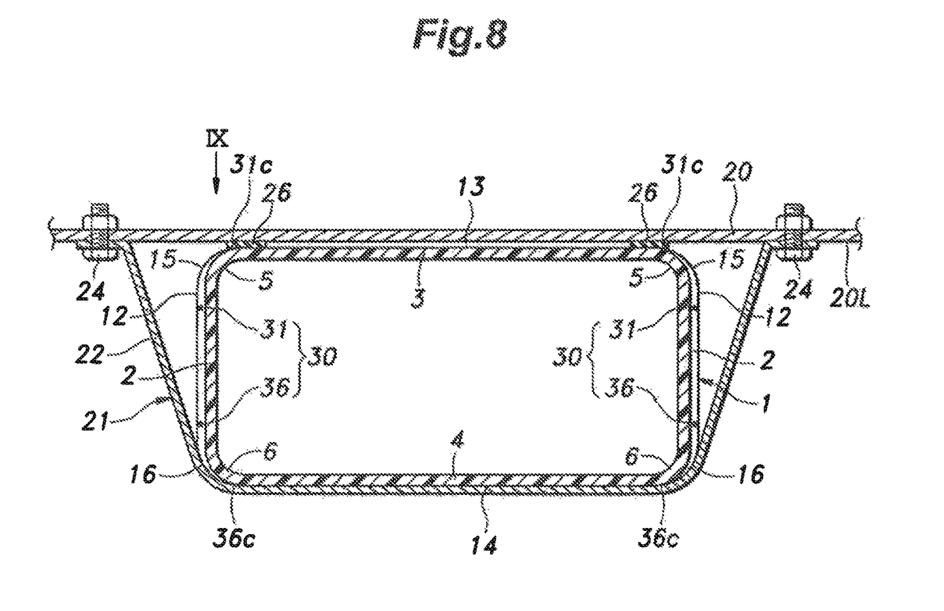
FIG. 8 is a cross-sectional view showing a fuel tank according to the third embodiment as mounted on the vehicle body.

As shown in FIG. 8, in the structure of this embodiment, the upper groove 31 extending downward from the upper surface 13 of the fuel tank 1 and the lower groove 36 extending upward from the lower surface 14 of the fuel tank 1 are connected with each other to form a single groove 30, in the same manner as in the second embodiment. On the other hand, the third embodiment differs from the first and second embodiments in that in the third embodiment, the upper groove 31 has a terminal end 31c in the upper surface 13 of the fuel tank 1 but does not have the upper extension groove part 31a, and the lower groove 36 has a terminal end 36c in the lower surface 14 of the fuel tank 1 but does not have the lower extension groove part 36a.

Figure 9:
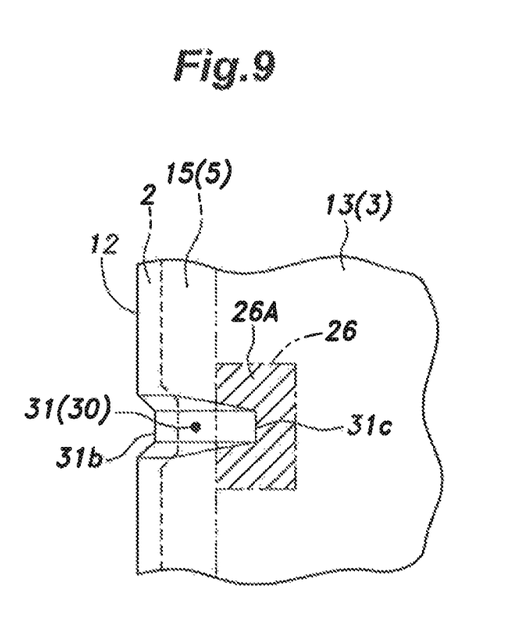
FIG. 9 is a top view showing an essential part of the fuel tank of FIG. 8 (showing the part as viewed in a direction indicated by arrow IX in FIG. 8)

As shown in FIG. 9, the cushion member 26 is disposed such that the contact area 26A with the upper surface 13 of the fuel tank 1 surrounds the upper groove 31 from three sides. Namely, the length of the cushion member 26 is set to be larger than the depth of the upper groove 31 in the upper surface 13 of the fuel tank 1.

Thus, even when the upper groove 31 cannot be extended in the upper surface 13 of the fuel tank 1 and the upper groove 31 has the terminal end 31c in the upper surface 13 of the fuel tank 1, the cushion member 26 is disposed over the part of the upper surface 13 of the fuel tank 1 provided with a high rigidity by the upper groove 31 and the contact area 26A of the cushion member 26 with the upper surface 13 of the fuel tank 1 surrounds the upper groove 31 from three sides, whereby the stress on the upper wall 3 is dispersed effectively.

Figure 10:
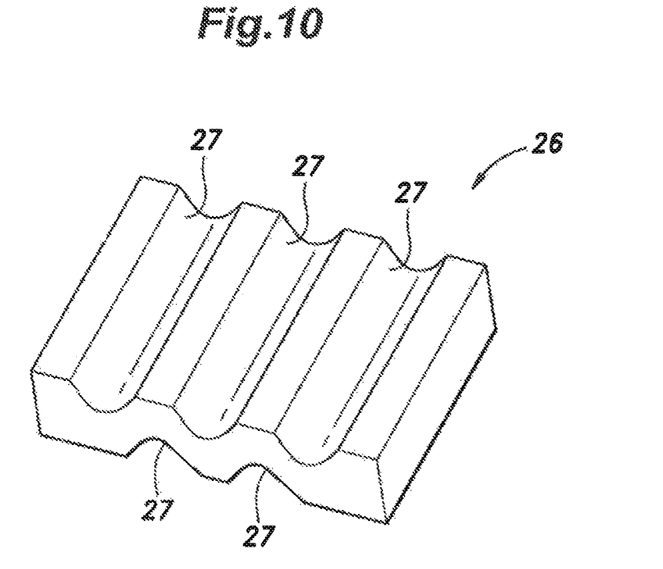
FIG. 10 is a perspective view showing another example of a cushion member.

The concrete embodiments have been described in the foregoing, but the present invention is not limited to the above-described embodiments, and may be altered appropriately within the spirit of the present invention. For example, the cushion member 26 does not have to be in the shape of a parallelepiped as described in the above embodiments, and may have another shape (for example, FIG. 10). FIG. 10 illustrates a cushion member 26 in which each of a surface to be in contact with the upper surface 13 of the fuel tank 1 and an opposing surface to be in contact with the lower surface 20L of the vehicle body 20 is provided with a plurality of grooves 27 over an entire length of the cushion member 26. Besides, the concrete structure, number, material, manufacturing method, etc. of the structural elements of the present invention shown in the above embodiments may be changed appropriately. Further, it is also possible to combine the structures shown in the above embodiments, and/or selectively adopt a part of the structural elements of the present invention shown in the above embodiments as appropriate.

Glossary 1 fuel tank
5 lower connecting wall
6 upper connecting wall
7 pinch-off part
12 side surface
13 upper surface
14 lower surface
15 upper connecting surface (outer surface of lower connecting wall)
16 lower connecting surface (outer surface of upper connecting wall)
20 vehicle body
21 band member
23 elastic sheet
23A contact area 26 cushion member
26A contact area
31 upper groove
31a upper extension groove part
31b bottom surface
31c terminal end
36 lower groove
36a lower extension groove part
36b bottom surface

The invention claimed is:

1. A mounting structure for mounting a fuel tank on a vehicle body, comprising:
   a fuel tank made of resin and disposed below the vehicle body;
   a band member disposed along a lower surface of the fuel tank and having both ends secured to the vehicle body;
   an upper groove formed in a side surface of the fuel tank to extend downward from an upper surface of the fuel tank over at least a part of the side surface of the fuel tank; and
   a cushion member interposed between the fuel tank and the vehicle body and straddling the upper groove, wherein:
   the upper groove has a terminal end in the upper surface of the fuel tank; and
   a contact area between the cushion member and the upper surface of the fuel tank surrounds the upper groove from three sides.

2. A mounting structure for mounting a fuel tank on a vehicle body, comprising:
   a fuel tank made of resin and disposed below the vehicle body;
   a band member disposed along a lower surface of the fuel tank and having both ends secured to the vehicle body;
   an upper groove formed in a side surface of the fuel tank to extend downward from an upper surface of the fuel tank over at least a part of the side surface of the fuel tank; and
   a cushion member interposed between the fuel tank and the vehicle body and straddling the upper groove, further comprising a lower groove formed in the side surface of the fuel tank to extend upward from the lower surface of the fuel tank over at least a part of the side surface of the fuel tank,
   wherein the band member is disposed to straddle the lower groove.

3. The mounting structure according to claim 2, wherein:
   the band member includes an elastic sheet provided on a surface thereof facing the fuel tank; and
   the elastic sheet is disposed to straddle the lower groove on the lower surface of the fuel tank.

4. The mounting structure according to claim 3, wherein:
   the lower groove includes a lower extension groove part that extends along the lower surface of the fuel tank; and
   the elastic sheet is disposed to straddle the lower extension groove part over an entire length of the lower extension groove part.

5. The mounting structure according to claim 4, wherein:
   the fuel tank includes a lower connecting wall that is curved to connect the side surface and the lower surface of the fuel tank with each other; and
   a curvature of a bottom surface of the lower groove in the lower connecting wall is smaller than a curvature of an outer surface of the lower connecting wall.

6. The mounting structure according to claim 2, wherein the upper groove and the lower groove are connected with each other.

7. The mounting structure according to claim 2, wherein the fuel tank has a pinch-off part formed on the side surface of the fuel tank to extend in a lateral direction; and
   the upper groove and the lower groove are separated by the pinch-off part.

* * * * *